Oct. 18, 1966     M. DENIS     3,280,018
METHOD FOR CHEMICALLY REACTING FLOWING GASES
Filed Jan. 15, 1963     7 Sheets-Sheet 1

Fig. 1

INVENTOR
MICHEL DENIS
By Kurt Kelman
AGENT

Oct. 18, 1966  M. DENIS  3,280,018
METHOD FOR CHEMICALLY REACTING FLOWING GASES
Filed Jan. 15, 1963  7 Sheets-Sheet 4

Fig. 4

INVENTOR.
MICHEL DENIS
By
Kurt Lebman
AGENT

Oct. 18, 1966 M. DENIS 3,280,018
METHOD FOR CHEMICALLY REACTING FLOWING GASES
Filed Jan. 15, 1963 7 Sheets-Sheet 5

Fig. 5

INVENTOR.
MICHEL DENIS
By
Kurt Kelman
AGENT

Oct. 18, 1966 M. DENIS 3,280,018
METHOD FOR CHEMICALLY REACTING FLOWING GASES
Filed Jan. 15, 1963 7 Sheets-Sheet 7

FIG. 8

INVENTOR.
MICHEL DENIS
BY
Kurt Kelman
AGENT

United States Patent Office 3,280,018
Patented Oct. 18, 1966

3,280,018
METHOD FOR CHEMICALLY REACTING FLOWING GASES
Michel Denis, Saint Germain-en-Laye, France, assignor to Institut de Recherches de la Siderurgie Francaise, Saint Germain-en-Laye, France, a professional institution of France
Filed Jan. 15, 1963, Ser. No. 251,685
Claims priority, application France, Aug. 1, 1960, 834,656
11 Claims. (Cl. 204—164)

This is a continuation-in-part of my United States applications Serial Numbers 126,120 and 126,137, both filed July 24, 1961, both now abandoned.

This invention relates to a method of reacting gaseous materials.

Many known chemical reactions in a gaseous medium must be carried out at fairly low pressure and at low temperature to yield a satisfactory amount of desired reaction products. A typical example of such a reaction is the cracking of hydrocarbons which involves an increase in the volume of the reacting gaseous mass, thus tending to increase the pressure. Yet, the products of the cracking process are often rather unstable at elevated temperatures.

Another example of a reaction of this type is the preparation of ozone from oxygen. Ozone is stable at appreciable concentrations only when at very low temperature. The reaction, moreover, is endothermic, making it necessary to supply energy to the starting material, and yet to cool the reaction product as rapidly as possible. This is difficult at best, and the same difficulty exists in the afore-mentioned cracking process.

Reactions of the type described thus are generally carried out in batch type equipment or in multiple stage equipment which requires multiple handling and conveying of substantial amounts of gas.

In the process of making ozone from oxygen, the low yield of the conventional processes makes it necessary to resort to continuous extraction of ozone from the reaction mixture, and to recycling of the unreacted oxygen. The ozone produced must be stored at low temperatures and even so presents a substantial explosion hazard.

It is the object of the invention to provide a method for carrying out continuous reactions in a gaseous medium at very low temperatures and at low pressures with good yields in a single stage.

Another object is the provision of such a method which is suitable also for endothermic reactions.

With these and other objects in mind, the method of the invention essentially consists in causing a gaseous medium to flow at supersonic speed, adiabatically expanding the flowing gaseous medium, whereby its temperature is lowered, and passing an electric discharge through the flowing expanded gas at its low temperature.

The electric discharge which provides the energy of initiation of the gas reaction may be more specifically an electric arc or a silent discharge, and an additional reactant may be introduced into the flowing gaseous medium adjacent the electric discharge, and preferably at a point spaced from the discharge in the direction of flow.

The apparatus for carrying out the afore-described method consists essentially of a supersonic nozzle of the venturi type through which the gaseous medium is passed at an initial pressure sufficient to cause it to be discharged from the nozzle at supersonic speed. A collector tube is axially aligned with the nozzle and is itself generally similar to a venturi, so that the tube and the nozzle form a gas conduit for the passage of the medium. A transverse opening between the tube and the nozzle communicates with an otherwise closed expansion chamber. An electrode is arranged in the conduit and is spaced from the same so that an electric discharge may be passed between a portion of the electrode and the conduit through the flowing medium. The electrode portion is arranged between the throat portion of the nozzle and the discharge portion of the collector tube.

In its more specific aspects, the invention considers employing an elongated electrode which axially extends at least through the nozzle, but may also project into the collector tube. The latter is shaped so that the gaseous medium discharged from the outlet of the nozzle maintains its supersonic speed in one axial portion of the tube, but has its speed reduced to subsonic speed in another portion. The effective portions of the electrode may be positioned in either portion of the collector tube depending on the results desired.

When the electrode is made tubular, it is employed to advantage as a feed conduit for feeding a reactant material to a portion of the gaseous medium. The tubular electrode may be shaped to alter the aerodynamic state of the reactant as it is fed to the reaction zone and to make it similar to that of the gaseous medium in the gas conduit. To permit the discharge of the reactant into the flowing gaseous medium, the tubular electrode may be formed with lateral or axial orifices which may be dimensioned and shaped to jointly constitute a porous portion of the electrode wall.

In another aspect of the invention, the collector tube is provided with means which constitute an electronic lens and constrict the path of the material flowing through the tube if the material was previously ionized by the electric discharge.

Other objects and many of the attendant advantages of this invention will be readily appreciated as the same becomes better understood by reference to the following detailed description when considered in connection with the accompanying drawings, wherein.

Figure 1:
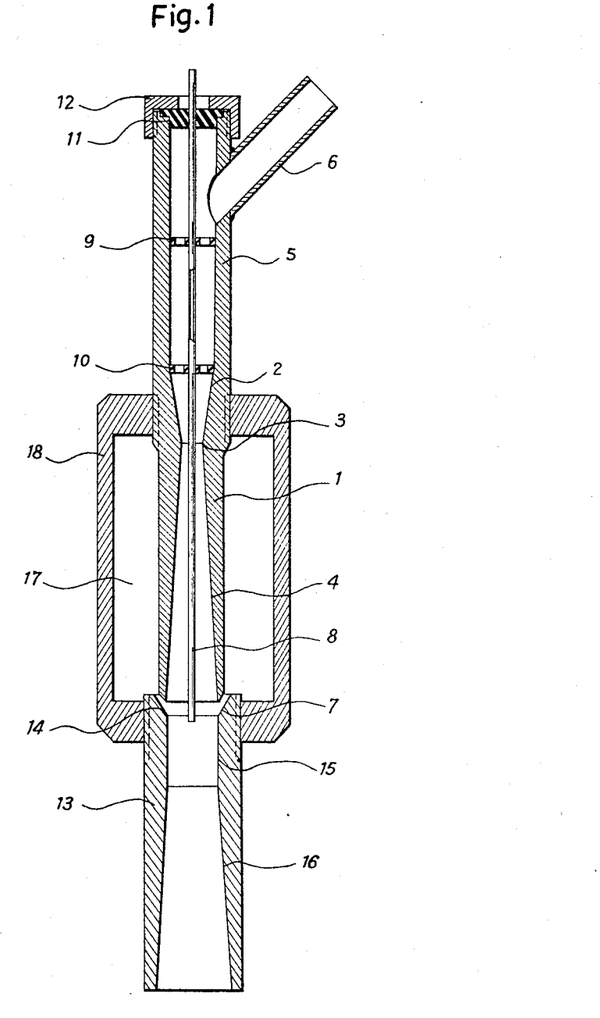
FIG. 1 shows a reactor for carrying out the method of the invention in an elevational, sectional view.

Referring now to the drawing in detail, and initially to FIG. 1, there is shown a reactor in elevational section through the axis of the elongated gas conduit in which the reaction takes place.

The conduit is partly formed by a supersonic nozzle 1 which has an inlet portion 2 tapering inwardly toward the throat 3 of the nozzle, and an outlet portion 4 flaring in a direction outward of the nozzle. A cylindrical coaxial tube 5 leads to the inlet portion 2. A lateral nipple 6 on the tube 5 is the source of the gaseous medium to be reacted. It will be understood that the nipple 6 during operation of the apparatus communicates with a pump or other means for providing the gas under adequate pressure.

A tubular electrode 8 is axially centered in the conduit by perforated spacer discs 9, 10 of electrically insulating material mounted in the tube 5. One terminal portion of the electrode 8 projects outward of the gas conduit through a sealing stopper 11 of insulating material at the end of the tube 5 remote from the nozzle 1. The stopper is held in place by a threaded cap 12 having an axial bore through which the electrode 8 passes. The other terminal portion of the electrode 8 projects slightly beyond the outlet orifice 7 of the nozzle 1.

A recompression collector tube 13 is arranged coaxially with the nozzle 1 but is axially spaced a small distance from the outlet orifice 7 of the nozzle. The tube 13 essentially consists of a short entrance portion 14 conically tapering inward toward a relatively long cylindrical central portion 15 which constitutes the throat of the tube 13, and an outwardly flaring discharge portion 16 the free end of which is open to the external pressure.

The dimensional relationships of the several portions of the nozzle 1 and of the tube 13 which need to be selected to achieve the results to be set forth hereinafter are a matter of common knowledge and will be readily determined on the basis of the present teachings by those skilled in the art from available material constants to suit actual operating conditions.

The tube 13 and the nozzle 1 are fixedly connected in axially aligned spaced relationship by a substantially closed expansion chamber 17 which communicates with the opening or gap formed between the nozzle orifice 7 and the entrance portion 14 of the tube 13. The wall 18 of the chamber 17 threadedly receives respective portions of the nozzle 1 and of the tube 13 in sealing engagement.

Except for the spacer discs 9, 10, and the stopper 11 which electrically insulate the electrode 8 from the remainder of the apparatus, the reactor illustrated is constructed of conductive material, such as metal. Any portion of the nozzle 1, another element of the gas conduit formed by the nipple 6, the tube 5, the nozzle 1, and the collector tube 13, or the chamber 17 is preferably grounded and the terminal portion of the electrode 8 projecting from the stopper 11 receives voltage from a suitable source of alternating electric potential the other pole of which is grounded. The open circuit voltage required in reactors of practical dimensions is of the order of several thousand volts. The frequency may be chosen to suit the chemical reaction involved. 50 or 60 cycles per second are satisfactory in many cases.

The electrode 8 is preferably tubular for several reasons some of which will become apparent hereinafter. It would not be convenient to support the electrode on spacers mounted in the nozzle 1. Under otherwise similar conditions, a tubular electrode 8 supported only in the tube 5 can be more securely positioned in a substantially axial position in the nozzle 1. Maintenance of a precisely centered positioin of the electrode 8, however, is not a necessary condition for operativeness of the apparatus.

The afore-described device operates as follows:

The gas in which a reaction is to be initiated or energized by an electric discharge is fed to the reactor through the nipple 6 at elevated pressure, say at 5 kilograms per square centimeter, and the nozzle 1 is so dimensioned that the ratio of pressures at the inlet and outlet orifices of the nozzle be, for instance, of the order of 50 to 1 or more.

The expansion of the gas takes place in the divergent outlet portion 4 of the nozzle 1 as is well known.

The rate of gas flow through the nozzle 1 is too high to permit any significant heat transfer between the gas and the nozzle, and the expansion of the gas which causes the temperature reduction may be considered as being adiabatic for all practical purpose. The lowest gas pressure prevails in the area of highest flow velocity which is at the outlet orifice 7. An electric discharge will therefore first take place at the orifice 7 between the electrode 8 and the wall of the outlet portion 4, and a stable condition of discharge will be established in this general area. Any minor divergence of the electrode 8 from a precisely axial position will not affect this location of the discharge.

The open circuit alternating voltage to be applied to the electrode 8, and the frequency of the alternating current which passes through the discharge zone are selected according to the dimensions of the apparatus, the nature of the reactant gas, and the reaction to be triggered or energized by the discharge following well established principles.

The pressure of the gas stream which is substantially below external pressure at the outlet orifice 7 is raised to external pressure during passage through the recompression collector tube 13, and the gas is released, if so desired, through the discharge portion 16. As shown in FIG. 1, the internal diameter of the cylindrical center portion 15 of the collector tube 13 is slightly greater than the diameter of the outlet orifice 7. Concurrently with the reduction of flow velocity of the gas, an increase in the pressure and temperature thereof occurs in the collector tube 13.

The volume of the expansion chamber 17 has an important function in the start-up or priming of the reactor, and contributes substantially to the stability of processing conditions in continuous operation. The initial gas stream flowing through the gas conduit exerts suction on the expansion chamber 17 which is evacuated and thereby helps to establish and to maintain fairly uniform low pressure in the general area of the outlet orifice 7. It prevents unpriming of the reactor by an accidental pressure rise in the outlet portion 4 which would break the electric discharge. Such an accidental pressure rise could readily occur if the gap between the orifice 7 and the collector tube 13 were open to the ambient atmosphere.

It is essential for obtaining good yields from the type of reaction initially described, that the reactions take place at a very low temperature, and preferably also at a fairly low pressure. Since the reactions in the method of this invention are initiated and also energized, if needed, by an electric discharge, it is necessary to cool the continuously flowing gas before it is subjected to the discharge. A very substantial reduction in temperature can be readily produced in the gas stream as it flows through the venturi type nozzle 1 at a speed greater than the speed of sound. It is well known that the lowest temperature that a gas flowing through such a nozzle can reach when flowing at sonic speeds is 0.8T wherein T is the temperature of the gas entering the nozzle expressed in absolute units, that is, measured on the Kelvin scale.

By supplying the gaseous medium to the nozzle at a pressure sufficient to cause supersonic gas flow, the method of the invention reduces the gas temperature to 0.3T or even less. Starting with a gas at room temperature, cooling to −200° C. is achieved very readily. The ratio of the absolute temperatures depends merely on the pressure ratio between the inlet and the outlet end of the nozzle, and is practically limited only by the temperature of liquefaction of the gas at the pressure prevailing at the outlet orifice 7.

In the type of reaction in which the method of the invention has its greatest utility, it is important that the gaseous medium pass the reaction zone as rapidly as possible. If the electric discharge be permitted to act on the reaction product for an excessive time, the yield may be severely reduced by secondary reactions. Operation at supersonic speed of gas flow inherently provides a minimum dwell time of the gas particles in the region of electric discharge. The low pressure which is beneficial to efficient utilization of the electrical energy supplied is also inherently obtained by the method of the invention.

Transition from the supersonic gas velocities in or near the electric discharge zone to the subsonic velocities which necessarily prevail in the gas stream at points more distant from the reaction zone causes a shock wave in the area where the expanded gas is again compressed to the ambient pressure prevailing at the open end of the apparatus. This shock wave limits the area of electric discharge in the flow space since the sudden pressure rise caused by the shock wave does not permit the discharge to be maintained.

This feature which also is inherent in the operation of the nozzle at supersonic speeds permits the electric discharge to be confined in a small area. If P be the gas pressure on the level of a transverse cross section of the nozzle 1, and $d$ be the distance between the axial electrode 8 and the nozzle wall, the product $P \times d$ reaches a minimum at the outlet orifice 7 of the outwardly flaring or diverging nozzle portion when the nozzle is in operative condition. The electric discharge will therefore always be initiated at the outlet orifice 7 of the nozzle 1 and will extend partly into the portion of the collector tube 13 which is before the shock wave in the direction of gas flow, if the energy of the discharge is of adequate magnitude. The discharge may be either an electric arc or a silent discharge.

The downstream terminal portion of the electrode 8 causes an area of discontinuity in the flow pattern of the gas, and triggers the formation of a shock wave which occurs earlier near the electrode than near the outer walls of the gas conduit. The shock wave thus is obliquely inclined relative to the conduit axis and its location is determined by that of the free end of the electrode 8. It is found under most practical conditions that the electric discharge occupies the entire space of the gas conduit which extends between the transverse plane defined by the orifice 7 and the shock wave.

Specific applications of the apparatus illustrated in FIG. 1 will be described in the following examples, but it will be understood that these examples are given for the purpose of illustration and that the invention is not to be limited thereto.

*Example 1*

Methane is admitted to the nozzle 1 of the apparatus shown in FIG. 1 at a pressure of 5 kg. per cm.$^2$. This pressure is sufficient to produce flow of the gas through the electric discharge at a speed which must exceed the speed of sound since a pressure of only approximately 50 g. per cm.$^2$ is established at the orifice 7, and the temperature of the gas stream drops from substantially room temperature to approximately −200° C.

The methane molecules are decomposed by the electric discharge, and the effluent gas stream consists essentially of hydrogen and acetylene. The reaction equilibrium which results in an overall volume increase as the methane is converted to acetylene and hydrogen is shifted toward the latter products by the very low pressure prevailing at the orifice 7, that is, in the area of the electric discharge.

The subsequent temperature increase during passage of the gas through the collector tube 13 is not sufficient to cause secondary reactions, and hydrogen and acetylene are withdrawn from the discharge portion of the collector tube 13.

Other gaseous hydrocarbons may be reacted in the reactor of FIG. 1 in a similar manner.

*Example 2*

Oxygen is fed to the reactor of FIG. 1 at a pressure of 6 kg. per cm.$^2$ substantially at room temperature. Passage through the nozzle 1 greatly reduces the pressure and temperature of the oxygen stream. The electric discharge passing through the flowing oxygen transforms a substantial portion of the gas into ozone which is fairly stable as long as the temperature of the gas stream is not raised too much. The low temperature of the gas stream in the area of electric discharge favors ozone formation, and a major portion of the electrical energy supplied is transformed into chemical energy, that is, into heat of formation of the ozone, and only a minor portion of the current supplied is transformed into sensible heat.

The very high velocity of the gas in the discharge zone which rapidly removes the ozone formed and prevents it from being heated by the caloric effects of the electric discharge is an important factor in the good ozone yield obtained. It is evident that release of the gas to the ambient atmosphere or to any vessel in which a gas pressure of an order of magnitude similar to atmospheric pressure prevails would involve a very substantial pressure increase, and therefore an increase in the gas temperature which practically amounts to a return to the starting temperature. At that temperature, the ozone content of the gas would be lost very rapidly. It is necessary, therefore, to use the ozone in a continuous reaction as it is formed.

In the present example, the ozone generated is employed for the partial oxidation of ethylene to formaldehyde. The ethylene is fed to the reaction zone through the hollow electrode 8 which is provided with a suitably placed orifice for this purpose, as will be described hereinafter in more detail in connection with FIGS. 3 and 4 of the drawing. For the purpose of this example, it is assumed that the electrode 8 of FIG. 1 is modified to provide an opening adjacent the outlet portion 4 of the nozzle 1 where the ozone concentration is highest. The ethylene is fed through the external terminal portion of the electrode 8 and the ozone reacts immediately with the ethylene.

It is assumed that the following reactions take place:

Whether reaction (I) is followed by reaction (II) or by reaction (III) depends on the presence or absence of water.

Figure 2:
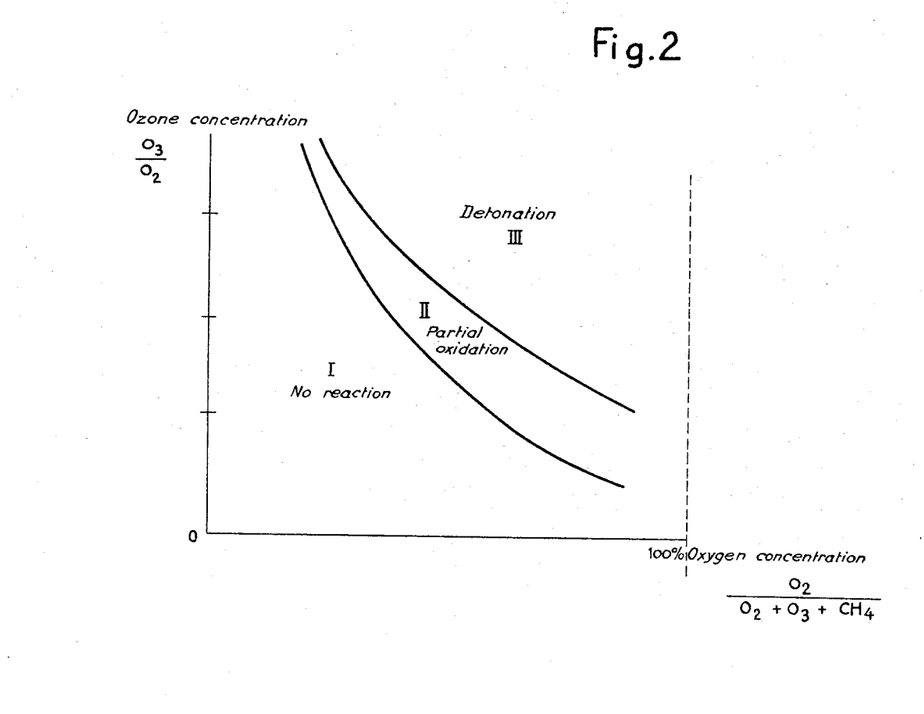
FIG. 2 is a chart graphically illustrating certain relationships of the reactions between oxygen, ozone, and methane in a gaseous mixture, and the concentrations of these substances in the reaction mixture.
Figure 3:
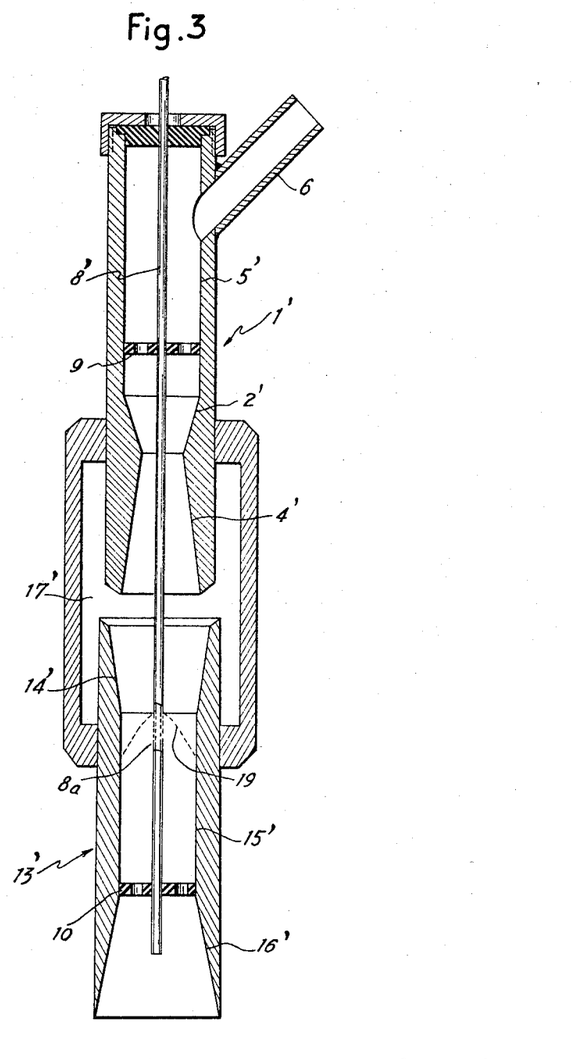
FIG. 3 shows a modified reactor in a view similar to that of FIG. 1.

FIG. 2 illustrates certain known relationships between the concentrations of the reactants and the type of reaction taking place when methane is injected into a stream of ozone bearing oxygen, and FIG. 3 illustrates a reactor of the invention, in which the reaction to which FIG. 2 is relevant is performed in a controlled advantageous manner.

The abscissa of the chart of FIG. 2 indicates the percentage concentration of oxygen in a reaction mixture consisting of oxygen, ozone, and methane. The ordinate is calibrated in arbitrary units of the ratio of ozone to oxygen in the same mixture. Two solid curves divide the area of the chart into three regions of which region I covers those combinations of oxygen concentration in the mixture and ratio of ozone to oxygen in which no oxidation of methane takes place, or in which the reaction takes place at such a slow rate as to be insignificant for practical application.

In the region III, the reaction is so rapid as to lead to spontaneous detonation and complete oxidation of the methane to carbon dioxide and water. Only in the intermediate region II is partial oxidation of the methane to methanol, formaldehyde, and formic acid possible. It will be understood that the actual position of the curves depends on such process variables as temperature, but the qualitative relationship of the three areas remains substantially unaffected by such variables, and the shape of the two curves which separate the three areas is always such that they approach each other as the ozone concentration increases, so that process controls become more critical with increasing ozone content of the reaction mixture.

In order to maintain reasonable control of the reaction, conventional processes for the oxidation of methanol with a mixture of oxygen and ozone at very low ozone concentrations which makes it necessary to recycle the very substantial portion of the oxygen which leaves the reaction zone unchanged. The reaction which leads from methane to its products of partial oxidation is necessarily very slow under conventional process conditions. The method of the invention makes it possible to react a mixture of oxygen and methane in an area of electric discharge in which the desired partial oxidation of methane takes place within a period of the order of magnitude of ten milliseconds.

The apparatus preferably employed for the oxidation of methane according to the method of the invention is illustrated in FIG. 3 in a view corresponding to FIG. 1, and is very similar to the first described embodiment of the reactor. The nozzle 1′ is integral with the cylindrical tube 5′ to which a gas stream is fed through the nipple 6. The dimensional relationships of the inlet portion 2′ and the outlet portion 4′ of the nozzle 1′ are somewhat modified to provide a gas channel through the nozzle 1′ which is relatively wider and shorter than that of the nozzle 1 in the reactor of FIG. 1.

The center portion 15′ of the collector tube 13′ is somewhat longer than has been shown in the reactor of FIG. 1, while the entrance portion 14′ and diverging discharge portion 16′ are both of substantially the same length as in FIG. 1. This change increases the overall length of the collector tube 13′. The convergent entrance portion of the collector tube receives the gases emerging from the nozzle 1′ and its length is not critical. The divergent discharge portion 16′ of the collector tube 13′ must have a small angle of divergence, preferably 6 to 8 degrees in order to avoid boundary layer separation and vortices. The length of the divergent portion 16′ determines the compression effect obtained. The diameter of the central portion 15′ is equal to that of the outlet orifice of the nozzle 1′. The expansion chamber 17′ is different in shape but very similar in function to the chamber 17 of FIG. 1. It communicates with a relatively wide annular gap between the outlet portion 4′ and the entrance portion 14′.

The entrance portion 14′ does not have an important function during normal operation of the apparatus but it helps priming of the reactor by drawing the gaseous contents from the expansion chamber 17′.

A tubular electrode 8′ extends through all portions of the nozzle 1′, and its free end is located in the discharge portion 16′ of the collector tube 13′. It is supported on insulating spacer discs 9 and 10 respectively arranged in the tube 5′ and in the portion of the collector tube 13′ in which the gas velocity is lower than the speed of sound, that is, adjacent the downstream end of the center portion 15′. The electrode 8′ is formed with several lateral outlets 8a arranged in the center portion 15′ near the upstream end thereof. The number and spacing of the outlets 8a is such that the corresponding wall portion of the electrode 8′ is actually porous. The lower end of the electrode 8′ is sealed.

Ogygen is fed to the tube 5′ through the nipple 6 at ambient temperature and at a pressure of approximately 6 kg. per cm.$^2$. As soon as normal operating conditions are established after the initial priming period, the pressure at the outlet orifice of the nozzle 1 is 0.1 kg. per cm.$^2$ or somewhat below that value. The low pressure area extends through the entrance portion 14′ of the collector tube 13′ to the shock wave 19 indicated by a broken line where there is a sudden increase in pressure.

The shock wave is triggered by the injection of methane through the tubular electrode 8′ and its lateral outlets 8a into the gas stream traveling at supersonic velocities in the cylindrical center portion 15′ of the collector tube 13′. The shock wave which is of the oblique type mentioned above, extends radially outward and downstream from the uppermost of the several outlets 8a in an approximately conical shape.

The electrode 8′ and the nozzle 1′ are connected to the two poles of an alternator producing an alternating electric potential of approximately 5000 volts. Neither the alternator nor the conductors connecting it to the reactor are shown in FIG. 3, but it will be obvious to the workers in this art. The potential applied produces an electric discharge in the supersonic region of the gas conduit, that is between the outlet orifice of the nozzle 1′ and the shock wave 19.

The energy of the discharge is sufficient to ionize the stream of oxygen, but is limited by known devices, such as a reactance arranged in series with the high voltage alternator, in such a manner that the ozone concentration be limited to that represented by the region I, or at most by the region II in the chart of FIG. 2, so that the ozone is insufficient to fully oxidize the methane.

To energize the reaction between the methane and the oxygen, a second electric discharge is necessary. Since the gas stream was ionized by the first electric discharge such a discharge may take place over a relatively long portion of the axial flow path.

The electrode 8′ extends through the supersonic flow region in the cylindrical center portion 15′ of the recompression collector tube 13′, the shock wave 19, and into the subsonic flow region beyond the shock wave. The product $P \times d$ mentioned above is slightly larger in the collector tube than at the outlet orifice of the nozzle 1′. No discharge would occur if the gas had not previously been made conductive by ionization.

Since the primary discharge is sufficiently strong, the gas remains at least partly ionized even after passing through the shock wave, and a discharge takes place in the subsonic flow region into which the electrode 8′ extends. This secondary discharge is of reduced power, but it may extend over a relatively great axial length of the collector tube, and thus act on the gas stream over a relatively long time.

It is preferred that the potential difference between the electrode 8′ and the collector tube 13′ for the secondary discharge be supplied by a second generator (not shown), and this may require interposition of insulating material in the conductive path between the nozzle 1′ and the collector tube 13′.

The second discharge thus takes place through a gas stream of relatively low velocity so that a reaction time of as much as ten milliseconds within the secondary discharge area can be obtained. This area extends substantially over the entire cylindrical center portion 15′ of the collector tube 13′, which has been made relatively long for this purpose.

In an extended run on the apparatus shown in FIG. 3, oxygen was fed to the tube 5′ at the rate of approximately 36 cubic meters per hour, and methane was fed to the tubular electrode 8′ at a rate which provided equimolecular amounts of oxygen and methane, or a slight excess of the latter which was controlled in such a manner as to avoid the presence of free oxygen in the gas mixture discharged.

The methane was partially oxidized and the reaction product discharged from the reactor consisted of 80 percent formaldehyde with minor amounts of methanol and of formic acid. The current consumed was 50 kw.

Figure 4:
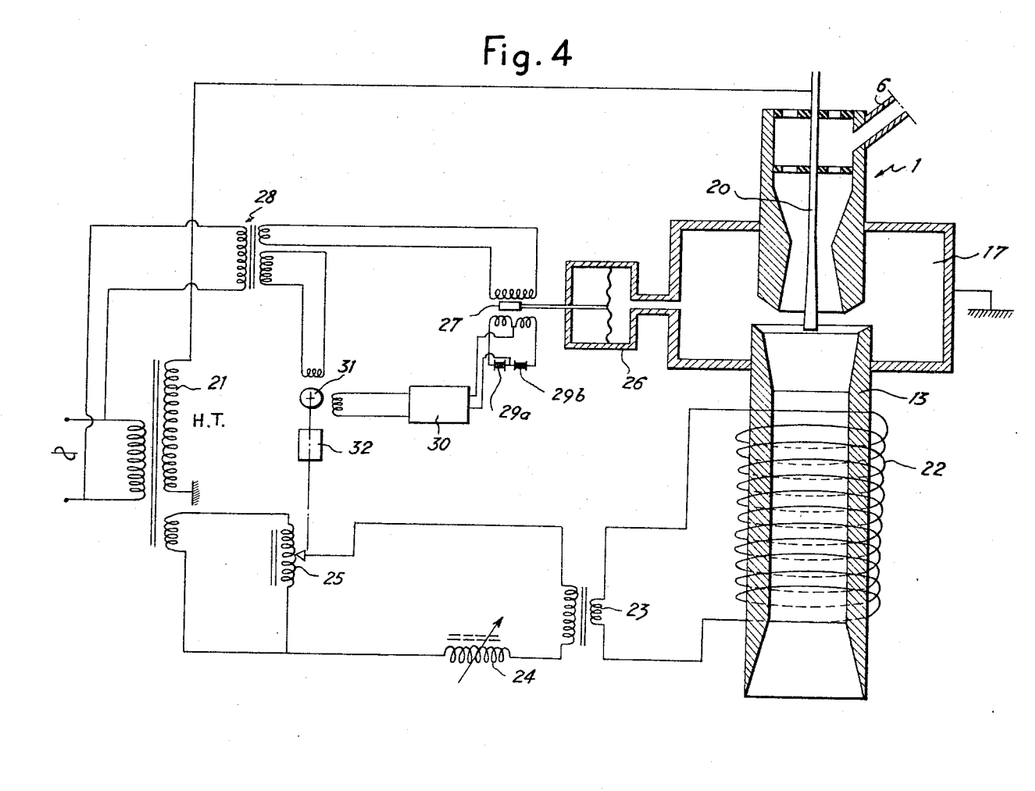
FIG. 4 illustrates another reactor in elevational section, and shows a wiring diagram of an electrical operating and control system cooperating with the reactor.

FIG. 4 shows another embodiment of the reactor of the invention particularly suitable for the oxidation of ethylene to formaldehyde by means of a mixture of oxygen and ozone relatively rich in the latter.

The reactor shown in FIG. 4 is substantially similar to that described in connection with FIG. 3, but the dimensions of the nozzle 1' and of the expansion chamber 17' have been distorted for the convenience of pictorial representation. The electrode 20 serves both as a carrier of electric energy and as a feed conduit. Its terminal portion in the reactor is located just below the outlet orifice of the nozzle 1', and the electrode flares in a direction toward that terminal portion.

The current supply system for the electric discharge between the electrode 20 and the wall of the gas conduit in the reactor includes a power transformer 21 the primary winding of which is connected to a power line providing alternating voltage of 110 or 220 volts at a frequency of 50 or 60 cycles. The transformer 21 is equipped with two secondary windings. A high voltage winding provides 20 kw. at 2000 volts and this energy is dissipated in an electric discharge in the area between the outlet orifice of the nozzle 1' and the shock wave which develops in the converging entrance portion of the collector tube 13'.

Oxygen is fed through the nipple 6 into the nozzle 1' under a pressure of 10 kg. per $cm.^2$. After the establishment of steady operating conditions, the pressure at the outlet orifice of the nozzle 1' and in the expansion chamber is approximately 0.1 atmosphere or kg. per $cm.^2$. The feeding rate is 18 cubic meters of oxygen per hour. The oxygen temperature at the outlet orifice of the nozzle 1' is lower than $-200°$ C.

The electrode 20 gradually flares towards its open free end in order to permit injection of the ethylene through the electrode under aerodynamic conditions similar to those of the ozone at the point of injection. When the ethylene is injected, the wake of the electrode in the stream of ozone and oxygen is filled with ethylene, and the shock wave thus is not attached to the free end of the electrode.

The ethylene immediately absorbs all ozone formed by the electric discharge, and an ethylene ozonide is formed which thereafter decomposes to form formaldehyde and oxygen, or formaldehyde and hydrogen peroxide if the reaction takes place in the presence of water vapor.

If it is desired to obtain a high yield, for example of 60 percent or more, the volume changes inherent in the oxidation of ethylene with ozone must be taken into consideration since the reaction with ozone plays an important role at the high ozone reactions available in the reactor of FIG. 4. It is necessary therefore to adapt the gas stream in the collector tube 13' to the conditions prevailing after the reaction.

For this purpose, the gas stream which largely consists of ionized particles is subjected to the action of an electronic or magnetic lens constituted by a winding 22 consisting of twenty turns of a copper rod having a cross section of 4 mm. x 5 mm. and insulated from each other which form a helix coaxial with the collector tube 13', and axially coextensive with the cylindrical center portion thereof which has an internal diameter of 2 cm.

The winding 22 is fed an alternating current of the same frequency as the current of the electric discharge, and having a maximum strength of 200 amperes. The current is derived from a low voltage secondary winding of the transformer 21 whose output is further modified by a step-down transformer 23 to a potential of 0.5 to 1 volt. The current flowing through the magnetic lens 22 must be out of phase by about one millisecond, or by a phase angle of 18° (at 50 cycles per second) with the current of the ionizing discharge, which in this instance is an electric arc, to take into account the time elapsed during passage of the material from the arc to the collector tube. Since the reactance of the winding 22 is negligible when compared to its resistance, the desired phase shift is achieved by a variable induction coil 24 having a movable iron core.

The low voltage supplied to the winding 22 is automatically adjusted to the reaction conditions by a servo mechanism which actuates a variable transformer 25 in such a manner as to maintain a constant predetermined pressure in the expansion chamber 17'. The chamber communicates with a conventional membrane pressure gauge 26 the membrane of which is connected by a linkage to the movable iron core of an electromagnetic pick up 27. This pick up has a primary winding supplied with alternating current from the main power supply, by a secondary winding of a power transformer 28. The two secondary windings of the pick-up 27 are arranged in a Wheatstone bridge circuit with two resistors 29a and 29b. The resistance value of the resistors determines the pressure in the chamber 17' for which the apparatus is set. Any deviation from the desired pressure causes a displacement of the iron core of the pick up 27 from a position in which the bridge circuit is at equilibrium, and an error signal is generated by the bridge.

The phase and amplitude of the error signal are indicative of the direction and magnitude of the deviation from the desired pressure. The signal is amplified in a magnetic amplifier 30 of a conventional type, and the amplified error signal is transmitted to the control phase of a two phase servomotor 31 the reference phase of which is energized by another secondary winding of the transformer 28. The servomotor 31 adjusts the output voltage of the variable transformer 25 to which it is connected by a speed reduction gear 32. The flow of current from the transformer 25 through the winding 22 of the magnetic lens causes a contraction of the gas stream in the collector tube 13' responsive to the magnitude of the current. The system operates to adjust the contraction produced until the pressure in the expansion chamber 17' is returned to the value corresponding to the equilibrium state of the Wheatstone bridge circuit.

In the reactor illustrated in FIG. 4, the shock wave is located in the cylindrical center section of the collector tube 13' and the gas flow at supersonic speed thus extends partly into the collector tube.

When the input of electric power into the electric discharge is high, or when the chemical reaction involved produces a rapid change in the specific density of the reaction mixture because of the resultant volume changes or temperature changes, it would not be possible to design a single collector tube adapted to all the operating conditions at which it would be expected to function. The pressure in the expansion chamber may thus rise and lead to unpriming of the supersonic nozzle 1'.

It is difficult to provide a collector tube the flow section of which can be varied according to the flow conditions. The collector 13' is thus dimensioned for the largest required flow section, and the action of the winding 22 on the gas stream is relied upon for contracting the flow path.

In a flowing gas subjected to the action of an alternating current arc, disturbances in the flow pattern occur in a cycle which is related to the periodicity of the alternating current feeding the arc. It is necessary therefore that the corrective measures be applied at the same frequency as the variations in the specific mass, taking into account the phase angle corresponding to the time required for an elementary volume of gas to travel from the electric discharge area to the area of variable flow path contraction. Since the molecules of the gas are ionized by the passage through the electric discharge, they are effectively acted upon by the magnetic field produced by the winding 22.

Similar electronic or magnetic lenses have been employed in other fields of technology requiring control or focusing of electrically charged moving particles such as in electron microscopes. Electrostatic fields are commonly used for such applications, and it will be understood that electrostatic means may be substituted for the winding 22 illustrated in FIG. 4, although the potential differences required to achieve the desired effect would be very high so as to make an electronic lens based on an electrostatic field unattractive at this time.

Figure 5:
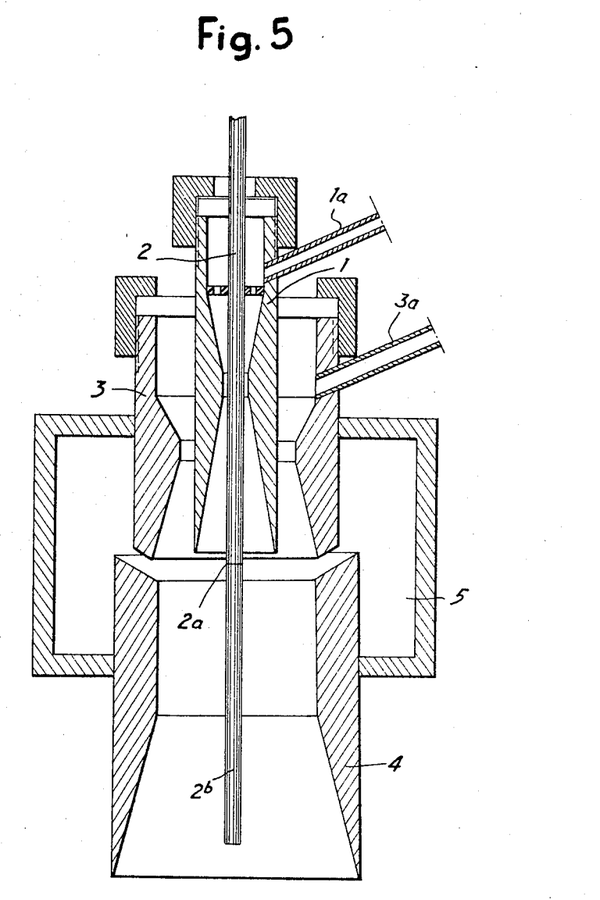
FIG. 5 is an axially sectional elevational view of an additional reactor.

The apparatus shown in FIG. 5 consists of an inner supersonic nozzle 41 of the aforedescribed converging-diverging type. The nozzle 41 is of a circular cross section. A nipple 41a communicates with the inlet portion of the nozzle 41 for feeding a gaseous reactant to the apparatus. It will be understood that the nipple 41a is connected to a source of gaseous reactant under a pressure adequate to cause discharge of the reactant from the outlet orifice of the nozzle 41 at supersonic speed.

A tubular metallic electrode 42 is arranged in the axis of the nozzle 41 and is electrically insulated therefrom. One terminal portion of the electrode which extends outward of the nozzle through a suitably sealed end wall of the nozzle serves as a terminal for connection to one pole of a source of high voltage. The other end of the electrode 42 projects slightly beyond the outlet orifice of the nozzle 41.

The outer cylindrical wall of the nozzle 41 is spacedly enveloped over a major portion of its axial length by a substantially coaxial second supersonic nozzle 43 which is shaped to provide an annular nozzle passage of the converging-diverging type. The inlet portion of the nozzle 43 is sealingly connected to the outer wall of the nozzle 41 and communicates with a nipple 43a through which a second reactant may be fed from a suitable source as described above in connection with the nipple 41a. The two nozzles 41 and 43 are grounded and thereby jointly connected to one pole of the source of high voltage the other pole of which is connected to the electrode 42. The annular outlet orifice of the nozzle 43 is axially spaced from that of the nozzle 41 in an outward direction.

A collector tube 44 is coaxially arranged with the nozzles 41, 43. Its internal diameter is similar to that of the outer nozzle 43, and it is axially spaced from the nozzles 41, 43 so as to provide a transverse annular opening therewith which communicates with an expansion chamber 45. The chamber, which is closed except for the aforementioned annular opening, is fixedly attached to the outer nozzle 43 and the tube 44. The expansion chamber 45 facilitates priming of the nozzles 41, 43 and stabilizes supersonic flow in the apparatus.

A tube 42b of fused silica which has the same outside diameter as the electrode 42 is coaxially attached to the end of the electrode 42 near the outlet orifices of the nozzles 41, 43 by a gas tight seal 42a. The electrode 42 and the tube 42b thus constitute a continuous supply conduit through which an additional reactant may be introduced into the outwardly flaring discharge portion of the tube 44 which also has an inwardly tapering entrance portion near the nozzle orifices and a cylindrical throat between the entrance and discharge portions.

The afore-described apparatus is well suited for converting tetramethyl ethylene or 2,3-dimethyl-2-butene to acetone by partial oxidation with ozone, and decomposition of the ozonide formed by reaction with water according to the following equations:

(I)

(II)

Oxygen is introduced into the apparatus through the nipple 41a at a pressure of 10 kg. per cm.² A potential difference of 2000 volts is established between the electrode 42 and the nozzle 41 so that an electric discharge takes place near the outlet orifice of the nozzle 41 between the electrode 42 and the nozzle wall. The discharge transforms a substantial portion of the oxygen into ozone.

Tetramethyl ethylene is pumped into the nipple 43a at a pressure of 6 kg./cm.² and a temperature of 200° C. The nozzles are so dimensioned that the mixture of oxygen and ozone from the nozzle 41 and the hydrocarbon from the nozzle 43 reach the reaction zone adjacent the opening leading to the expansion chamber 45 at substantially the same pressure of 1/15 atmosphere which also prevails in the expansion chamber as soon as a steady state is established.

The discharge from the electrode 42 is confined within the stream of oxygen and ozone and does not reach the molecules of tetramethyl ethylene which enter the reaction zone at supersonic speed, at the aforementioned low pressure, and at a temperature which is above the boiling point at the pressure of the reaction zone. The reaction between the hydrocarbon and the ozone is instantaneous under the prevailing reaction conditions and practically all ozone present is bound according to form an ozonide when the combined stream of reactions reaches the axially open end of the tube 42b from which water is injected into the reaction mixture to decompose the ozonide formed.

The mixture of acetone and hydrogen peroxide withdrawn from the discharge portion of the tube 4 is separated into the constituent parts by fractionation or other known methods.

The basic type of apparatus illustrated in FIG. 5 is also well suited for performing reactions requiring a plurality of spaced electric discharges. An example of such a reaction is that between ethylene and chlorine to form hydrochloric acid.

For this purpose, gaseous ethylene is introduced into the central nozzle 41 through the nipple 41a at a pressure of 10 kilograms per square centimeter. The rate of flow of the ethylene is controlled at 6 liters per second (21.6 cubic meters per hour as measured under standard conditions of temperature and pressure). When an effective alternating potential of 1200 volts at 50 cycles is applied to the central electrode 42 and the wall of the nozzle 41 in the afore-desribed manner, an electrical discharge consuming 40 kilowatts takes place.

The ethylene is converted to acetylene and hydrogen in the manner described hereinbefore:

Chlorine is fed to the outer nozzle 43 through the nipple 43a at a pressure of 6 kg./cm.² and at a rate of 11 liters per second (about 40 m.³ per hour). An alternating voltage of 2000 volts applied to the nozzles 41 and 43 actuates a second electric discharge consuming approximately 5 kilowatts. The discharge takes place in the flowing chlorine and activates the same by partly transforming the chlorine molecules to chlorine ions which initiate the reaction with acetylene.

The following reactions take place in the collector tube 44 to form hydrogen chloride:

Carbon particles are thus produced as a by-product. Dichloroethylene CHCl=CHCl and tetrachloroethane are also formed by secondary reactions.

Water is injected into the gas stream through the silica tube 42a at the outlet of the collector tube 44. The reaction products are thereby cooled after a reaction time of approximately 10 milliseconds, and the gaseous hydrogen chloride formed dissolves in the water. The water-insoluble chlorinated hydrocarbons are readily separated from the aqueous medium and from each other for use as solvents in a known manner.

The nozzle 43 and the collector tube 44 are conductively connected by the wall of the expansion chamber 45, and are grounded. The nozzle 41 and the electrode 42 are insulated from each other and from ground.

It will be understood by those skilled in the art that the desired convergent-divergent shape of the outer nozzle 3 may also be achieved by making the outer wall of the nozzle cylindrical and by varying the external diameter of that portion of the nozzle 1 which is axially coextensive with the nozzle 3, or by varying the diameters of both the outer and the inner wall of the nozzle 3 over the length thereof in any desired manner to achieve the well known covergent-divergent shape characteristic of a supersonic nozzle.

Figure 6:
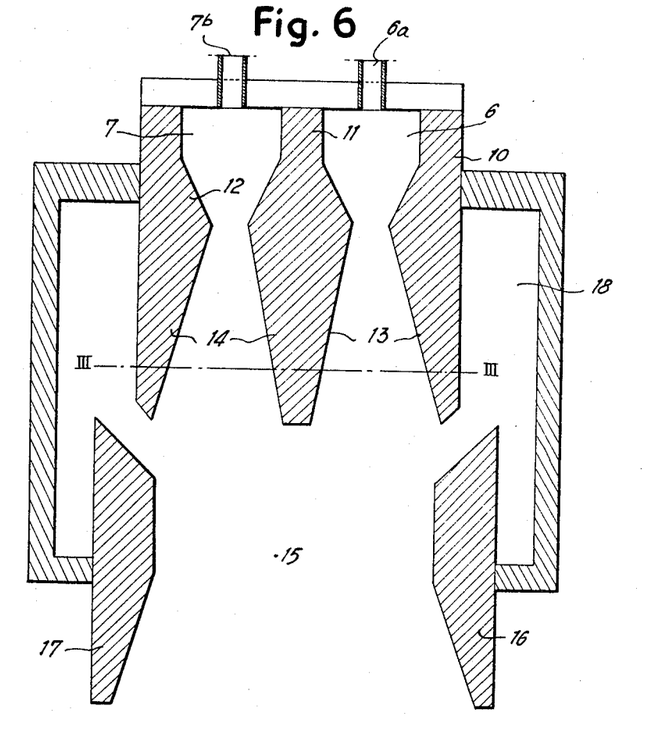
FIG. 6 shows yet another reactor having a plurality of nozzles in an elevational view in section on the axes of the several nozzles.
Figure 7:
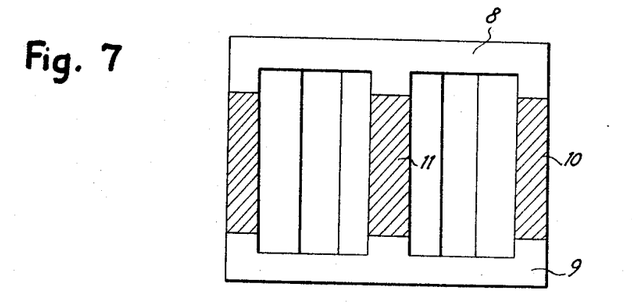
FIG. 7 shows the apparatus of FIG. 6 in fragmentary section on the line VII—VII.

An additional embodiment of the apparatus of the invention is shown in FIG. 6 in a view analogous to that of FIG. 5, and in FIG. 7 in partial cross section through the outlet portions of the several nozzles of FIG. 6.

The two supersonic nozzles 46 and 47 of the apparatus of FIGS. 6 and 7 are of elongated rectangular cross section. Each nozzle is formed by two opposite longitudinal walls which constitute the short sides of the cross section, and will be referred to as the narrow walls, and by another pair of opposite longitudinal walls which constitute the long sides of the cross section, and will be referred to as the wide walls.

The narrow walls 48, 49 of both nozzles 46, 47, extend in two parallel planes. The narrow walls are of fused quartz which is an excellent electrical insulator, and are flat. Each narrow wall of one nozzle forms an integral unit 48, 49 with the corresponding wall of the other nozzle.

The two nozzles 46, 47 have one wide wall 51 in common and each have an additional wide wall 50, 52. The wide walls are of brass or other conductive material, and are separated from each other by the electrically insulating narrow walls 48, 49. The wide walls are shaped to give the desired convergent-divergent shape to the nozzles 46, 47. Those portions of the wide walls 50, 51, 52, which constitute the respective outlet portions 53, 54 of the nozzles 46, 47, diverge at an angle of 8° or less in order to prevent boundary layer separation from the nozzle walls in the supersonic flow area.

The branched conduit which is partly formed by the nozzles 46 and 47 is further extended by a recompression collector tube 55 which is also of rectangular cross section. Two of its four walls are extensions of the quartz walls 48, 49. They are joined by two brass walls 56, 57, shaped to impart to the collector tube 55 a convergent-divergent shape with a throat of uniform cross section interposed between the inwardly tapering entrance portion and the outwardly flaring discharge portion. The tube 55 receives the respective gas streams discharged from the outlet portions of the nozzles 46, 47, and raises their pressure to one similar to the ambient pressure while reducing their speed below the speed of sound.

An expansion chamber 58 is secured to the nozzles 46, 47 and the tube 55, and communicates with the branched conduit in the interior of the apparatus through openings provided between the walls 50, 52 of the nozzles 46, 47 and corresponding walls 56, 57 of the tube 55.

The apparatus illustrated in FIGS. 6 and 7 is very similar to that shown in FIG. 5, but it will be appreciated that for an equal pressure drop under otherwise similar conditions the nozzles of the apparatus shown in FIGS. 6 and 7 have to be longer than the nozzles of circular cross section shown in FIG. 5. Cross sectional areas of axially spaced portions of the nozzles shown in FIGS. 6 and 7 vary only proportional to the first power of axial distance, whereas in the nozzles of FIG. 5 the change in cross sectional area is proportional to the square of the axial distance.

The operation of the apparatus shown in FIGS. 6 and 7 will now be described with reference to the partial oxidation of ethylene to formaldehyde by ozone, a reaction that can be continuously carried out in this type of apparatus with excellent yields.

The nozzle 46 is connected to a supply of oxygen under a pressure of 6 kg. per cm.$^2$ by means of an axial inlet pipe 46a. After passing through the throat of the nozzle 46, the oxygen is expanded to a pressure of approximately 1/10 atmosphere. An electric discharge is formed in the expanded oxygen between the brass walls 50 and 51 which are connected to respective poles of a high voltage generator which is not shown since it is well known in itself. Any portion of the brass walls accessible from the outside may serve as a terminal for connection to the high voltage source.

The electric discharge starts and is maintained between the diverging wall portions 53 of the nozzle near the outlet orifice of the nozzle 46 where the gas pressure is lowest, and the oxygen is transformed into ozone.

Ethylene is similarly fed to the nozzle 47 through an inlet pipe 47b from a pressure source. The two streams leave the outlet orifices of the nozzles 46 and 47, and are mixed in the tube 55 where the ozone formed instantaneously reacts with the ethylene according to the formula The gas mixture is recompressed in the tube 55 to a pressure near atmospheric pressure, and its speed of flow is reduced to a value below the speed of sound. The ethylene ozonide formed is decomposed in the absence or presence of water respectively according to the following formulas:

The brass wall elements 51 and 52 which enclose the nozzle 47 and the wall elements 56 and 57 of the recompression collector tube 55 are conductively connected and grounded so that they are at the same electric potential. No electric discharge takes place in the ethylene nor in the ozonide in order to avoid premature destruction of the gas molecules. The potential difference between the brass electrodes 50 and 51 may be of the order of several thousand volts to provide a discharge of the desired intensity through the stream of oxygen.

If it is desired to react two gaseous reactants each of which is to undergo a reaction under the influence of an electric discharge, separate sources of high voltage may be respectively arranged in parallel with the brass walls 50, 51 and 51, 52, or a single source of correspondingly higher voltage may be connected across the walls 50 and 52, with a bi-polar center electrode constituted by the wall 51 insulated from either wall 50 and 52 so that the two discharges in the nozzles 46 and 47 respectively are arranged in series. If so desired, an electric potential may also be applied to the wall elements 56 and 57 for supplying energy to a combined stream of reactants passing through the nozzles 46 and 47, and those skilled in the art will provide insulation between the wall elements of the tube 55 and those of the nozzles 46 and 47 where such insulation is appropriate without requiring further instructions.

While apparatus assembled from two nozzles has been illustrated, it is evident that more than two nozzles may be combined to accommodate a greater number of reactants at the desired reaction conditions of low pressure, low temperature, and supersonic flow speeds in connection with an energy supply constituted by an electric discharge to provide either the energy of initiation of a reaction, or the energy needed to maintain an endothermic reaction, or both.

Figure 8:
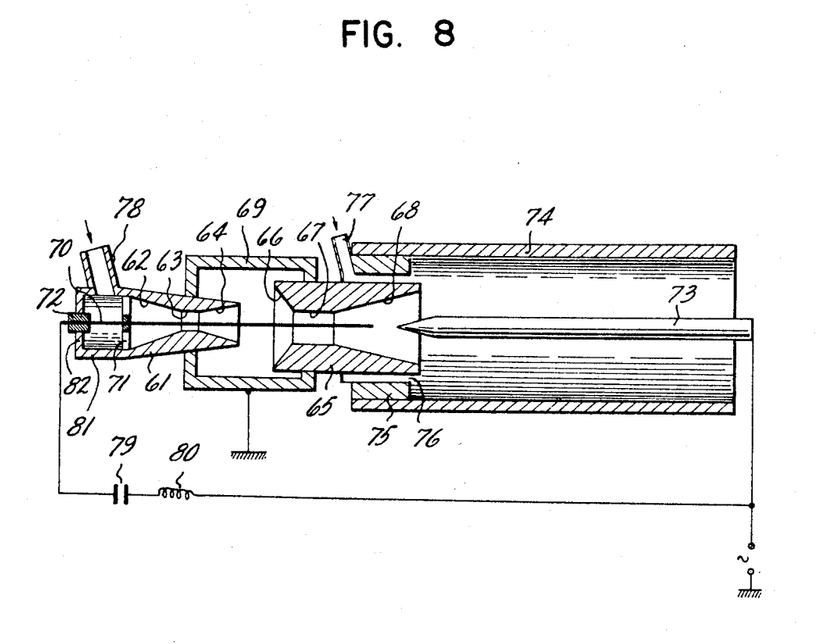
FIG. 8 illustrates a further embodiment of the invention in a view corresponding to that of FIG. 4.

Referring now to FIG. 8, there is shown yet another reactor of the invention in elevational section through the axis of the elongated gas conduit in which the reaction takes place. The conduit is partly formed by a venturi type nozzle 61 which has an inlet portion 62 conically tapering inwardly toward the throat 63 of the nozzle, and an outlet portion 64 conically flaring in a direction outward of the nozzle. A cylindrical coaxial tube 81 leads to the inlet portion 62. A lateral nipple 78 on the tube 81 is a first source of the gaseous medium to be reacted. It will be understood that the nipple 78 during operation of the apparatus communicates with a pump or other means for providing the gaseous medium under adequate pressure.

The nozzle 61 is sealed into a wall of an expansion chamber 69, and a collector tube 65 coaxial with the nozzle 61 is sealed into an opposite wall of the chamber 69. The flow section of the expansion chamber 69 transversely of the common axis of the nozzle 61 and the collector tube 65 is much larger than the flow section of any portion of the nozzle 61, and of the collector tube 65. The latter has a conical inlet portion 66 sharply tapering toward a cylindrical throat 67, and an outlet portion 68 which conically flares in a direction away from the throat 67.

A rod-shaped electrode 70 is axially centered in the conduit formed by the nozzle 61, the chamber 69, and the collector tube 65. One end portion of the electrode 70 is fastened to a cover 82 which closes the axial end portion of the tube 81 remote from the nozzle 61, and is electrically insulated from the cover 82 by a plug shaped insulator 72. Another axial portion of the electrode 70 is supported in the tube 81 adjacent the inlet portion 62 by a perforated spacer disc 71 of electrically insulating material. The electrode 70 freely extends from the spacer 72 through the nozzle 61, the chamber 69, the inlet portion 66 and the throat 67 of the collector tube 65, and terminates in the outlet portion 68 of the tube 65.

A sleeve 75 of electrically insulating refractory material is interposed between the collector tube 65 and a cylindrical graphite tube 74 of relatively large internal diameter. Axial passages 76 in the ring 75 connect the axial cavity of the tube 74 with a feed tube 77 which constitutes a second source of gaseous medium.

A second rod-shaped electrode 73 is a coaxially mounted in the graphite tube 74 by means not further illustrated. The electrode 73 the diameter of which is much greater than that of the electrode 70 extends into the outlet portion 68 of the collector tube 65 where it terminates in a pointed end portion axially spaced from the electrode 70.

The tube 81 with its cover 82, the nozzle 61, the expansion chamber 69, and the collector tube 65 are of electrically conducting material, and are jointly grounded. One pole of a source of 2,000 volt alternating current is connected directly to the electrode 73, and is connected to the electrode 70 through a coil 80 and a condenser 79 arranged in series. The second pole of the current source is grounded.

The apparatus illustrated above may be employed for converting methane to acetylene in the following manner:

Methane is admitted to the nozzle 61 through the nipple 78 under a pressure of seven atmospheres at a rate of ten liters per second. Methane is simultaneously admitted at lower pressure and at a rate of two liters per second directly to the graphite tube 74 through the supply tube 77, and axial passages 76. This gas at a lower pressure is destined to blow any arc which could take place between the graphite tube 74 and the collector tube 65. Said methane at a lower pressure will then contribute to the reaction. Passage through the nozzle 61 reduces the pressure of the methane admitted through the nipple 78 to approximately 0.1 atmosphere while increasing its flow velocity well beyond the speed of sound. The practically adiabatic expansion of the methane in the nozzle 61 lowers the temperature of the methane to a temperature close to its boiling point at the pressure prevailing in the outlet portion 64 of the nozzle 61.

Since the pressure is lowest near the discharge end of the outlet portion 64, and the flow velocity highest in that area, an electric discharge is initiated between the electrode 70 and the walls of the nozzle 61 at this point. The discharge continues along the electrode 70 between the electrode and the collector tube 65, and maintains the flowing gas in a state of ionization which permits a second discharge to take place between the mass of the collector tube 65 and the electrode 73.

Passage through the expansion chamber 69 and the collector tube 65 increases the pressure and the temperature of the flowing gas to an extent that a discharge could not take place between the electrode 73 and the tube 65 in the absence of gaseous ions produced by the initial discharge in the rapidly flowing gas stream discharged from the nozzle 61. The flow velocity at the outlet portion 68 is subsonic.

While a condenser 79 of fixed capacity and a coil 80 of fixed inductivity have been shown in the drawing and are preferred in normal operation of the apparatus under uniform conditions, it will be appreciated that a variable condenser and a coil of variable inductane will preferably be employed in experimental work intended to establish optimum values for any given set of operating conditions. It is thus possible to control the magnitude and the phase of the current fed to the electrode 70 independent to the magnitude and phase of the current supplied to the electrode 73. The phase shift between the two electrodes is preferably selected in such a manner that the ionization of the gas being discharged from the tube 65 is at its maximum when the potential of the electrode 73 begins to rise. The time for initiating the second discharge between the electrode 73 and the collector tube 65 is thereby reduced to a minimum. Such discharge initiation takes place twice during each current cycle. Actually, if no current passes during a portion of the cycle, gas flowing past the electrode 73 during this moment may not be reacted, and the output of desired products is impaired.

Alternating current is preferred as a source of energy for the endothermic chemical reaction which transforms methane to acetylene. It is also possible to employ direct current. The use of direct current somewhat increases reaction yield by avoiding the initiation period for the electrical discharge during each cycle. It has been found, however, that the greater complexity of the necessary controls more than balances the advantage of the greater yield obtained with direct current.

The current supplied to the electrode 70 in the specific example of the method of the invention was 5 kilowatts, whereas 160 kilowatts of current were fed to the electrode 73. The length of the tube 74 was 20 centimeters to make the dwell time of the gas stream in the tube approximately one millisecond. Other dimensions of the apparatus employed may be estimated from the drawing, which is drawn approximately to scale.

The gas discharged from the tube 74 was quenched by injection of a jet of water droplets in a manner well known in itself, and not further illustrated in FIG. 8, and the acetylene formed was separated from other constituents of the reaction mixture.

While the solid electrode 73 illustrated in the drawing is entirely satisfactory for short runs, it is preferred to employ an internally water-cooled electrode for longer runs if the electrode is desired not to be consumed during the reaction. The temperature of a graphite electrode without internal cooling rises substantially during the production of acetylene from methane, and such a hot electrode emits electrons, thus contributing to the ionization of the gas, and to the establishment of a stable discharge at high current.

In the embodiment of the invention illustrated in FIG. 8 a relatively minor portion of the energy input is employed for ionizing the gaseous reactant when at low temperature and low pressure, and a major portion of the energy consumed by the apparatus is employed for the heat of formation of acetylene in the highly endothermic reaction in which acetylene is formed from partly ionized methane at relatively high pressure and temperature within the graphite tube 74 where the flow velocity of the gas is below the speed of sound. The ratio of the minor to the major portion of the dissipated energy is approximately one order of magnitude, that is, approximately one to ten. In this manner, the current passed through the electrode 70 can be held at a value low enough to avoid premature destruction of the electrode, and the electric discharge may be cold, having a minimum of thermal energy.

The circuit which includes the electrode 73 and the cylindrical tube 74 carries much heavier current at lower voltage, and the discharge produced is of an entirely different character. The second discharge zone must be protected from the atmosphere in order to avoid dilution of the reaction products, and this function is performed by the tube 74. The tube also provides a suitable flow channel to prevent the formation of a zone of stagnant gases surrounding the gas stream. In such a zone, an intense parasitic discharge may be established about a stationary track of ionized particles. The cylindrical tube 74 is well suited to contain the stream of reactants and to avoid pockets of stagnant gas.

The length of the tube 74 may be chosen at will according to the desired reaction time at the prevailing flow rate. Graphite is an excellent conductive material of construction for the tube 74 because of its chemical inertness and thermal resistance. It may be replaced by an externally cooled metal tube, or by a refractory ceramic tube equipped with suitably cooled electrodes.

Normally liquid hydrocarbon mixtures when vaporized and diluted with a carrier gas have been found capable of transformation to acetylene in the apparatus illustrated in FIG. 8. Methane is preferred carrier gas since it participates in the reaction in the manner indicated above.

Obviously many other modifications and variations of the present invention are possible in the light of the above teachings. It is, therefore, to be understood that, within the scope of the appended claims, the invention may be practiced otherwise than as specifically disclosed.

What I claim is:
1. A method of performing a continuous reaction in a gaseous medium which comprises:
   (a) causing said gaseous medium to flow in a predetermined direction at supersonic speed;
   (b) substantially adiabatically expanding said flowing gaseous medium to a minimum pressure, whereby the temperature of said medium is reduced;
   (c) selectively passing an electric discharge transversely of said direction through said flowing expanded gaseous medium while at said reduced temperature and at said minimum pressure; and
   (d) reducing the speed of flow thereof from said supersonic speed to a subsonic speed while simultaneously increasing the pressure of said medium from said minimum pressure thereof.

2. A method as set forth in claim 1, which further comprises introducing a material into a portion of said flowing gaseous medium adjacently downstream of said discharge, and reacting said material with said portion of said medium.

3. A method of performing a continuous reaction between a plurality of gaseous substances which comprises:
   (a) causing each of said substances to flow at supersonic speed in a respective separate path;
   (b) substantially adiabatically expanding each of said flowing substances to a minimum pressure, whereby the respective temperatures thereof are reduced;
   (c) selectively passing an electric discharge through one of said flowing expanded substances transversely of the paths thereof while at said reduced temperature and at said minimum pressure;
   (d) combining said substances to a common stream; and
   (e) reducing the speed of said common stream to subsonic speed while simultaneously increasing the pressure of said substances in said stream above said minimum pressure.

4. A method of performing a continuous reaction between a plurality of gaseous substances which comprises:
   (a) causing each of said substances to flow at supersonic speed in a respective separate path;
   (b) substantially adiabatically expanding each of said flowing substances to a substantially common minimum pressure, whereby the respective pressures thereof are reduced;
   (c) combining said substances into a common stream substantially having said common minimum pressure;
   (d) passing an electric discharge transversely through said common stream; and
   (e) thereafter reducing the speed of said common stream to subsonic speed while simultaneously increasing the pressure thereof above said common pressure.

5. A method as set forth in claim 3, wherein another electric discharge is passed through another one of said flowing expanded substances while the same is passing in the separate path thereof at said reduced temperature and at said minimum pressure.

6. A method of performing a continuous reaction between a plurality of gaseous substances which comprises:
   (a) causing said plurality of substances to flow at supersonic speed in respective separate paths;
   (b) substantially adiabatically expanding said plurality of flowing substances in the respective paths thereof to respective minimum pressures, whereby the respective temperatures thereof are reduced;
   (c) selectively passing a plurality of electric discharges through said plurality of substances transversely of the respective paths after said substances reach said reduced temperatures and said minimum pressures thereof;
   (d) combining said substances into a common stream; and
   (e) reducing the speed of said common stream to subsonic speed while simultaneously increasing the pressure of said substances in said streams above said minimum pressure.

7. A method of performing a continuous reaction in a gaseous medium which comprises:
   (a) causing said gaseous medium to flow at a supersonic speed in a predetermined direction;
   (b) substantially adiabatically expanding said flowing gaseous medium, whereby the temperature and pressure of said medium are reduced to a minimum;
   (c) selectively passing a first electric discharge through said flowing expanded gaseous medium transversely of said direction after said medium reaches said reduced pressure to ionize a portion of said medium;
   (d) thereafter reducing the speed of said partly ionized expanded medium to subsonic speed and compressing the same; and
   (e) passing a second electric discharge through the partly ionized compressed medium transversely of the direction of flow thereof.

8. A method as set forth in claim 7, wherein the energy of said second discharge is substantially greater than the energy of said first discharge.

9. A method of performing a continuous reaction in a gaseous medium which comprises:
   (a) causing a continuous stream of a gaseous medium to flow at supersonic speed;
   (b) substantially adiabatically expanding said flowing stream until the pressure of the medium is reduced substantially to a minimum, whereby the temperature of the flowing medium is reduced;
   (c) passing an electric discharge through the flowing expanded gaseous medium in a direction transverse of said stream after said medium reaches said reduced temperature and pressure; and (d) thereafter reducing the speed of flow of said stream to a subsonic speed and simultaneously increasing said pressure thereof from said minimum.

10. A method as set forth in claim 1, wherein a portion of said medium is ionized by said discharge, and an electric field is applied to said partly ionized medium while flowing at said subsonic speed for constricting said medium.

11. A method as set forth in claim 1, wherein a portion of said medium is ionized by said discharge, and a magnetic field is applied to said partly ionized medium while flowing at said subsonic speed for constricting said medium.

References Cited by the Examiner

UNITED STATES PATENTS

| | | | |
|---|---|---|---|
| 1,367,842 | 2/1921 | Thomas | 204—328 |
| 2,860,094 | 11/1958 | Ishizuka | 204—164 |
| 2,945,797 | 7/1960 | Cherrier | 204—164 |
| 3,003,939 | 10/1961 | Rouy et al. | 204—164 |
| 3,005,762 | 10/1961 | Fenn | 204—164 |
| 3,079,325 | 2/1963 | Butenuth | 204—328 |

JOHN H. MACK, *Primary Examiner.*

WINSTON A. DOUGLAS, *Examiner.*

H. S. WILLIAMS, *Assistant Examiner.*